Nov. 7, 1939.   E. FISCHEL ET AL   2,179,179
SERVOMOTOR FOR THE REMOTE CONTROL OF AIRCRAFT
Filed Nov. 24, 1937
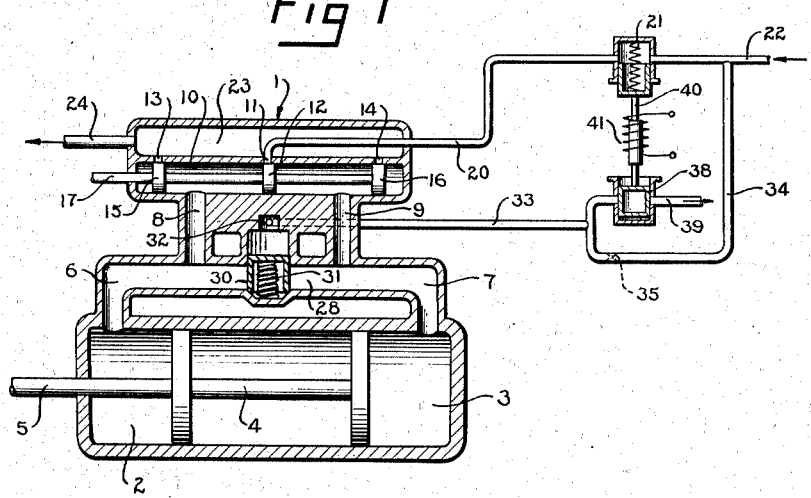
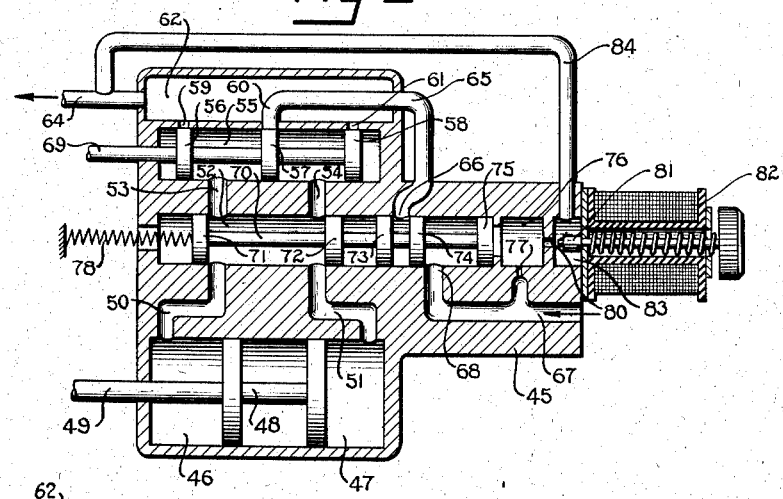
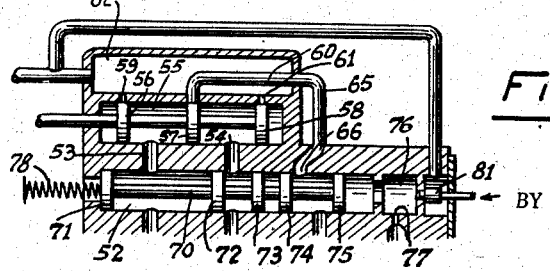
INVENTOR.
Edward Fischel
Johannes Thiry
Stephen Cerstvik
BY
ATTORNEY.

Patented Nov. 7, 1939

2,179,179

UNITED STATES PATENT OFFICE 2,179,179

SERVOMOTOR FOR THE REMOTE CONTROL OF AIRCRAFT

Eduard Fischel and Johannes Thiry, Berlin-Charlottenburg, Germany, assignors to Siemens Apparate und Maschinen Gesellschaft mit beschränkter Haftung, Berlin, Germany, a corporation of Germany Application November 24, 1937, Serial No. 176,385
In Germany November 26, 1936

12 Claims. (Cl. 121—38)

This invention relates to servomotors and more particularly to servomotors for the remote control of vehicles such as aircraft.

An object of the invention is to provide a compact, simple and dependable servomotor of the above type.

Another object is to provide a servomotor which may be readily rendered inoperative when the control is to be taken over manually.

Another object is to provide a device of the above type which is automatically and promptly rendered operative when the manual control is terminated.

Another object is to provide a servomotor having novel and improved details of construction and combinations of parts.

Various and other objects and advantages will be apparent as the nature of the invention is more fully disclosed.

The novel features which are believed to be characteristic of this invention will be pointed out more particularly in the claims appended hereto. The invention itself may be better understood, however, by referring to the following description, taken in connection with the accompanying drawing, in which certain specific embodiments thereof have been set forth for purposes of illustration.

In the drawing,

Fig. 1 is a sectional view, partly diagrammatic, of a servomotor embodying the present invention;

Fig. 2 is a similar sectional view illustrating a further embodiment of the present invention, with the elements thereof in position for manual operation; and Fig. 3 is a similar sectional view of a part of the device of Fig. 2, with the elements thereof in position for power operation.

Referring to the drawing, the servomotor is shown in Fig. 1 as comprising a housing 1 having a pair of operating cylinders 2 and 3 actuating a double-ended piston 4 having a piston rod 5 attached thereto which is adapted to be connected to the mechanism controlled, such as the rudder, for controlling the operation of the vehicle. The piston 4 is actuated by fluid pressure which is supplied by conduits 6 and 7, communicating with the cylinders 2 and 3 respectively. These conduits 6 and 7 are in communication with supply conduits 8 and 9 which in turn communicate with a valve cylinder 10 having an inlet port 11 closed by a valve piston 12 and a pair of outlet ports 13 and 14 closed by valve pistons 15 and 16 respectively. The valve pistons 12, 15 and 16 are mounted on a valve rod 17 which may be connected to the directional control device, not shown. The inlet port 11 is connected to a pipe 20 which connects through a valve 21 with a fluid pressure supply pipe 22. Outlet ports 13 and 14 communicate with a chamber 23 which in turn is connected to a return or discharge pipe 24.

In order to eliminate the drag of the piston 4 when the craft is to be controlled manually, a by-pass channel 28 is provided in the housing 1 which interconnects the conduits 6 and 7. This by-pass channel 28, when open, permits free circulation of the fluid between the cylinders 2 and 3 so that the piston 4 may be freely moved by manual means. For closing the by-pass channel 28 a valve 30 is provided which is normally held open by a spring 31. The valve 30 communicates with a fluid pressure cylinder 32 to which fluid is supplied through a supply pipe 33 from a pipe 34 communicating with the main supply pipe 22. A restriction 35 is provided in the pipe 34 to reduce the flow through the pipe 34 for the purpose to be described. The arrangement is such that fluid pressure supplied to the cylinder 32 closes the valve 30 against the action of spring 31, thereby separating conduits 6 and 7 and placing the device in condition for remote control.

In order to release the fluid pressure on valve 30, a discharge line 39 is provided having a valve 38 which is adapted, when open, to permit the fluid supplied through pipe 34 to be discharged through pipe 39 instead of building up pressure in the cylinder 32. The restriction 35 in pipe 34, however, reduces the flow of fluid under these conditions to a value such that the fluid pressure in the main supply line 22 is not appreciably reduced.

Suitable means may be provided for operating valve 21 and 38 in unison. In the form shown, these valves are connected by a link 40 which is actuated by a solenoid 41 so that when the valve 21 is closed the valve 38 is opened, and when the valve 21 is opened the valve 38 is closed.

In the position of the valves shown in Fig. 1, the device is under the act of being changed over from manual to remote control but valve 30 is shown in completely closed position. Solenoid 41 has been actuated to open valve 21 and to close valve 38. It is the closure of valve 38 that permits pressure to be built up in the cylinder 32 from supply pipe 34, thereby closing valve 30 and blocking by-pass channel 28. The opening of valve 21 permits fluid pressure to be supplied through pipe 20 to valve cylinder 10. In the position shown, port 11 is closed by valve piston 12 and outlet ports 13 and 14 are closed by valve pistons 15 and 16. In this position no control effect is exercised and piston 4 will remain in its central position.

When control is to be effected to move the piston 4 either to the right or to the left, the control mechanism is caused to move valve rod 17 to the right or left, as the case may be. Movement of this rod to the right, for example, causes the valve piston 16 to uncover the outlet port 14 and to place the same in communication with channel 9 leading to cylinder 3. This same movement causes movement of valve pistons 12 and 15 to the right, places port 11 in communication with channel 8, thereby supplying fluid pressure to piston 2 and permitting the fluid to be removed from cylinder 3 through outlet port 14 and return pipe 24. This causes movement of piston 4 to the right, which continues until the pressures are equalized by returning valve rod 17 to its initial position.

Movement of valve rod 17 to the left effects a reverse operation, placing channel 8 in communication with outlet port 13 and channel 9 in communication with inlet port 11.

When the control is to be taken over manually, solenoid 41 is actuated to close valve 21 and to open valve 38. Closing valve 21 interrupts the fluid pressure supply to pipe 20. Opening valve 38 serves to bleed cylinder 32 through exhaust pipe 39, thereby reducing the pressure in cylinder 32 and permitting the valve 30 to open under the action of spring 31. This opens by-pass channel 28 and permits free manual operation of the piston 4.

It is to be noted that the closing of valve 30 simultaneously with or prior to the opening of valve 21 prevents the pressure in pipe 20 from being lost through the by-pass channel 28. For example, if valve 30 were allowed to remain open after pressure is supplied to pipe 20 with valve rod 17 not in neutral position, the fluid pressure would be applied directly from inlet port 11 through by-pass channel 28 to return pipe 24. The automatic closing of valve 30, however, prevents this from taking place and insures the prompt return of the device to condition for remote operation.

It will be further noted that in the case where a plurality of servomotors are operated from the same supply line 22, one of the servomotors can be cut out of operation and taken over manually by means of the system above described without reducing the fluid pressure within line 22 and interfering with the operation of the other servomotors. Valves 21 and 38 are preferably so designed that when the device is shifted over to automatic operation the valve 38 is closed before the valve 21 opens. This insures the closing of valve 30 before fluid pressure is supplied to servomotor valve cylinder 10.

In the embodiment shown in Fig. 2, the various control valves are formed in a unitary structure. In this embodiment, a housing 45 is provided having cylinders 46 and 47 formed therein cooperating with a double-ended piston 48 connected to a piston rod 49 by which the control is effected. Cylinders 46 and 47 connect through channels 50 and 51 with a valve cylinder 52, thence through channels 53 and 54 with a valve cylinder 55.

The valve cylinder 55 contains valve pistons 56, 57 and 58 controlling respectively outlet port 59, inlet port 60 and outlet port 61. The outlet ports 59 and 61 communicate through a chamber 62 with an outlet or return pipe 64. Inlet port 60 is connected by a conduit 65 to a port 66 in valve cylinder 52. The source of fluid pressure is connected to a channel 67 in the housing 45 which communicates with valve cylinder 52 through a port 68. Valve pistons 56, 57 and 58 are mounted on a valve rod 69 which is connected to the control apparatus, not shown.

A valve rod 70 is slidably mounted in valve cylinder 52 and carries; a piston 71 adapted to engage the end of valve cylinder 52 for limiting the movement of valve rod 70; a piston 72 adapted to close the communication between the channels 50 and 51 through valve cylinder 52 when the valve rod 70 is in its left-hand position; a piston 73 serving as a guide element; a piston 74 adapted to prevent communication between ports 66 and 68 when valve rod 70 is in its right-hand position and to permit such communication when valve rod 70 is moved to the left; and a piston 75 adapted to receive fluid pressure from a chamber 76 which communicates through a restricted port 77 with supply channel 67. The arrangement is such that pressure within chamber 76 acting on piston 75 causes valve rod 70 and associated pistons to move to the left-hand position, which is the position for remote operation of the control mechanism by means of the servomotor. When the pressure within chamber 76 is released, a spring 78 moves valve rod 70 to the right, which is the position as shown in Fig. 2 and which is the position for manual operation.

For controlling the pressure within the chamber 76, a discharge port 80 is provided which is closed by a pin 81 controlled by a solenoid 82. The discharge port communicates with a chamber 83 which is connected by a pipe 84 to the discharge or return pipe 64.

With the parts as shown in Fig. 2, this embodiment is adapted for manual operation of the control mechanism. In this position the solenoid 82 is deenergized. The pin 81 is retracted from discharge port 80. Pressure in chamber 76 is reduced by leakage of the fluid through discharge port 80 and thence through pipe 84 to return pipe 64. Valve rod 70 is in its right-hand position in which piston 74 shuts off communication between supply channel 67 and pipe 65, thereby releasing the pressure on the servomotor control, and piston 72 is at the right, thereby establishing communication between the channels 50 and 51, which serve to by-pass cylinders 46 and 47. The servomotor is accordingly rendered inoperative and piston 48 may be manually operated.

In changing over to remote control, solenoid 82 is energized, thereby causing pin 81 to close port 80 as shown in Fig. 3. This permits pressure to build up in chamber 76 which acts against piston 75 to shift valve rod 70 to the left. This movement of the valve rod first causes piston 74 to close port 66 and does not establish communication between port 66 and port 68 until the valve rod has moved a sufficient distance so that piston 72 has passed the channel 51, as shown in Fig. 3, thereby interrupting the by-pass between channels 50 and 51 through valve cylinder 52. Pressure is then applied through pipe 65 to the valve cylinder 55 which is adapted to control the position of piston 48 in response to a suitable actuation of the valve rod 69.

In the above described system it is to be noted that the control valves may be actuated from a remote point such as the pilot's seat of an aircraft and that several servomotors may be actuated in unison from the same source of fluid pressure. Valves 21 and 38 in Fig. 1 or the corresponding elements in Fig. 2 may be connected to actuate a plurality of servomotors, if desired. In the embodiment of Fig. 2, the by-pass channels of several servomotors may be shut off due to displacement of the valve rod 70 by the use of suitable pistons. The construction is accordingly adapted to permit the connecting or disconnecting of several servomotors either collectively or independently, inasmuch as the disconnecting of one servomotor does not disturb the pressure supplied to the other servomotors.

It is to be understood that the throttle restriction 35 of Fig. 1 may be disposed in pipe 39, if desired, in which case it must be suitably designed to release the pressure within control cylinder 32 without reducing the pressure on the line.

Furthermore, the device may be so arranged that the discharge channel may be shut off instead of the by-pass channel, and it is to be understood that various types of servomotors, either hydraulically or pneumatically driven, may be substituted for the embodiment shown herein.

Although certain specific embodiments have been shown for purposes of illustration, it is to be understood that the invention is capable of various uses and that various changes and modifications may be made therein as will readily appear to a person skilled in the art. The invention is to be limited only in accordance with the following claims.

What is claimed is:

1. A servomotor, comprising a control member, a cylinder having a pair of pressure fluid chambers reversibly actuating said control member, a pressure fluid supply line supplying fluid under pressure to said chambers, a pressure fluid by-pass interconnecting said chambers and adapted, when open, to permit free operation of said control member, a fluid pressure actuated valve closing said by-pass, means supplying fluid under pressure from said supply line to actuate said valve, means controlling said supply of fluid, means controlling the supply of fluid to said chamber, and means for simultaneously operating said control means to cut off the supply of said pressure fluid to said chambers when said valve is actuated towards open position.

2. A servomotor, comprising a control member, a cylinder having a pair of pressure fluid chambers reversibly actuating said control member, a pressure fluid supply line supplying fluid pressure to said chambers, a pressure fluid by-pass interconnecting said chambers and adapted, when open, to permit free operation of said control member, a fluid pressure actuated valve closing said by-pass, means supplying fluid under pressure from said supply line to actuate said valve, means controlling the supply of fluid to said chambers, means controlling the supply of fluid to said valve, and means for timing the operation of both said means whereby fluid pressure is supplied to said valve for closing the same prior to the restoration of pressure fluid to said chambers.

3. A servomotor, comprising a control member, a cylinder having a pair of pressure fluid chambers reversibly actuating said control member, a pressure fluid supply line supplying fluid under pressure to said chambers, a pressure fluid by-pass interconnecting said chambers and adapted, when open, to permit free operation of said control member, a fluid pressure actuated valve closing said by-pass, means supplying fluid under pressure from said supply line to actuate said valve, means controlling the supply of fluid to said chambers, additional means controlling the supply of fluid to said valve, said last means being interconnected to operate in unison so that fluid pressure is restored to said valve to close the same prior to the restoration of pressure fluid to said chambers.

4. A servomotor, comprising a control member, a cylinder having a pair of pressure fluid chambers reversibly actuating said control member, a pressure fluid supply line supplying fluid under pressure to said chambers, a pressure fluid by-pass interconnecting said chambers and adapted, when open, to permit free operation of said control member, a fluid pressure actuated valve closing said by-pass, a passage supplying fluid under pressure from said supply line to actuate said valve, means to release the pressure in said passage for opening said valve, said passage having a restriction adapted to limit the passage of fluid therethrough whereby the release of pressure on said valve is prevented from affecting the fluid pressure in said supply line.

5. A servomotor, comprising a control member, a cylinder having a pair of pressure fluid chambers reversibly actuating said control member, a pressure fluid supply line supplying fluid under pressure to said chambers, a pressure fluid by-pass interconnecting said chambers and adapted, when open, to permit free operation of said control member, a fluid pressure actuated valve closing said by-pass, a passage having a restriction through which fluid is supplied to said valve to actuate the same, and control means in said passage behind said restriction to release the fluid pressure on said valve for opening the same.

6. A servomotor, comprising a control member, a housing provided with a cylinder having a pair of pressure fluid chambers reversibly actuating said control member, a valve cylinder in said housing having a control valve therein to control the supply of fluid to said chambers, a pressure fluid by-pass formed in said housing and interconnecting said chambers, a valve for closing said by-pass, fluid pressure means actuating said valve, means to interrupt the supply of fluid to said valve cylinder, said last means being mechanically interconnected with said by-pass valve whereby, when said valve is closed, pressure fluid is supplied to said valve cylinder for reversibly actuating said control member and when said valve is open the supply of pressure fluid to said control cylinder is interrupted.

7. A servomotor, comprising a control member, a housing provided with a cylinder having a pair of pressure fluid chambers reversibly actuating said control member, a valve cylinder in said housing having a control valve therein to control the supply of pressure fluid to said chambers, a pressure fluid by-pass formed in said housing and interconnecting said chambers, a valve for closing said by-pass, fluid pressure means actuating said valve, means to interrupt the supply of fluid to said valve cylinder, said last means being mechanically interconnected with said by-pass valve whereby, when said valve is closed, pressure fluid is supplied to said valve cylinder for reversibly actuating said control member and when said valve is open the supply of pressure fluid to said control cylinder is interrupted, means controlling the supply of pressure fluid to said valve, and electromagnetic means controlling said last means.

8. A servomotor, comprising a control member, a cylinder having a pair of pressure fluid chambers reversibly actuating said control member, a pressure fluid supply line supplying fluid under pressure to said chambers, a pressure fluid by-pass interconnecting said chambers and adapted, when open, to permit free operation of said control member, a fluid pressure actuated valve closing said by-pass, means supplying fluid under pressure from said supply line to actuate said valve, control means to control the pressure on said valve, control means to control the supply of fluid from said line to said chambers, and means interconnecting both of said control means for operation in unison whereby the supply of fluid to said chambers is prevented except when said valve is closed.

9. A servomotor, comprising a control member, a cylinder having a pair of pressure fluid chambers reversibly actuating said control member, a pressure fluid supply line supplying fluid under pressure to said chambers, a pressure fluid by-pass interconnecting said chambers and adapted, when open, to permit free operation of said control member, a fluid pressure actuated valve closing said by-pass, means supplying fluid under pressure from said supply line to actuate said by-pass valve, a control valve controlling the pressure on said by-pass valve, a second control valve controlling the supply of fluid to said chambers, and means interconnecting said control valves to operate in unison whereby fluid is supplied to said chambers only when said by-pass valve is closed.

10. A servo-motor comprising a control member, a housing provided with a cylinder having a pair of pressure fluid chambers reversibly actuating said control member, a valve cylinder in said housing having a control valve therein to control the supply of fluid to said chambers, a pressure fluid by-pass formed in said housing and inter-connecting said chambers, means closing said by-pass, means responsive to fluid pressure for controlling said closing means, and means to interrupt the supply of fluid to said valve cylinder, said last two means comprising a plurality of pistons mounted on a common piston rod movable in said by-pass.

11. A servo-motor comprising a control member, a housing provided with a cylinder having a pair of pressure fluid chambers reversibly actuating said control member, a valve cylinder in said housing having a control valve therein to control the supply of fluid to said chambers, a cylinder providing a by-pass interconnecting said chambers, a piston slidable in said by-pass cylinder for closing said by-pass, a valve port leading from said by-pass cylinder to the inlet of said control valve, an inlet to said by-pass cylinder, and a piston slidable in said by-pass cylinder for closing the connection between said valve port and said inlet.

12. A servo-motor, comprising a control member, a housing provided with a cylinder having a pair of pressure fluid chambers reversibly actuating said control member, a source of pressure fluid, a valve cylinder in said housing having a control valve therein to control the supply of fluid to said chambers, a cylinder providing a by-pass interconnecting said chambers, a piston mounted on a piston rod slidable in said by-pass cylinder for closing said by-pass, a second piston mounted on said piston rod, a restricted orifice leading from said pressure fluid source to said second piston, and electro-magnetic actuated means controlling the pressure on the outside of said orifice.

EDUARD FISCHEL.
JOHANNES THIRY.